United States Patent
Ladang et al.

(10) Patent No.: US 6,384,096 B1
(45) Date of Patent: May 7, 2002

(54) PRODUCT MADE OF COMPLIANT CROSSLINKED POLYOLEFIN FOAM

(75) Inventors: Michel Ladang, Battice; Dominique Petit, Blegny, both of (BE)

(73) Assignee: Norton S.A. Performances Plastics, Chaineux (BE)

( * ) Notice: Subject to any disclaimer, the term of this patent is extended or adjusted under 35 U.S.C. 154(b) by 0 days.

(21) Appl. No.: 09/570,029

(22) Filed: May 12, 2000

Related U.S. Application Data

(63) Continuation of application No. 09/405,230, filed on Sep. 24, 1999, now abandoned.

(30) Foreign Application Priority Data

Sep. 24, 1998 (FR) .............................................. 98 11912

(51) Int. Cl.$^7$ .................................................. C08J 9/00
(52) U.S. Cl. ........................ 521/142; 521/79; 521/143; 521/144
(58) Field of Search ................................ 521/142, 143, 521/144, 79

(56) References Cited

U.S. PATENT DOCUMENTS

| | | | |
|---|---|---|---|
| 3,812,225 A | | 5/1974 | Hosoda et al. |
| 5,087,359 A | | 2/1992 | Kakodkar et al. |
| 5,844,009 A | * | 12/1998 | Hurley et al. ................. 521/142 |
| 5,883,144 A | * | 3/1999 | Bambara et al. ............. 521/144 |
| 5,883,145 A | * | 3/1999 | Hurley et al. ................ 521/144 |
| 6,103,775 A | * | 8/2000 | Bambara et al. ............. 521/144 |
| 6,197,841 B1 | * | 3/2001 | Takimoto et al. ............ 521/144 |

FOREIGN PATENT DOCUMENTS

| | | |
|---|---|---|
| FR | 2.006.957 | 1/1970 |
| JP | 9-150431 | 6/1997 |

* cited by examiner

Primary Examiner—Morton Foelak
(74) Attorney, Agent, or Firm—Oblon, Spivak, McClelland, Maier & Neustadt, P.C.

(57) ABSTRACT

The product made of crosslinked polyolefin foam of the invention is characterized by a compression of at most 7 N/cm$^2$, measured according to the ASTM D 1667 standard with a degree of compression of 30% and a rate of compression of 10 mm/minute, for a density of at least 100 kg/m$^3$, it being understood that this maximum compression may decrease for lower densities and increase for higher densities. The invention comprises, moreover, the application of this product as a seal.

12 Claims, No Drawings

PRODUCT MADE OF COMPLIANT CROSSLINKED POLYOLEFIN FOAM

This application is a Continuation of application Ser. No. 09/405,230 filed on Sep. 24, 1999, now abandoned.

The present invention relates to a product made of crosslinked polyolefin foam.

Crosslinked polyolefin foams are flexible foams having relatively low densities, generally of less than 200 kg/m$^3$, and the solid phase of which essentially consists of crosslinked polyolefins. The polyolefins most usually employed in this field are polyethylene (PE), polypropylene (PP) and ethylene/vinyl acetate copolymer (EVA).

Crosslinking allows the foams to be improved on many points, regarding their mechanical properties; finer cellular structures are obtained.

The crosslinking may consist of high-energy irradiation, such as by an electron beam, of a chemical reaction with agents of the peroxide type or with moisture by the incorporation of a silane side group into the backbone of the polyolefin. In the first two processes mentioned, reactive sites with free radicals are created on the carbon chains of the polyolefin molecules, for the purpose of subsequently forming intermolecular crosslinking bonds.

In the third process (crosslinking using moisture), the crosslinking is achieved by forming polyolefin-Si-O-Si-polyolefin intermolecular bonds.

Crosslinking using high-energy irradiation is noteworthy in its ability to produce perfectly uniform crosslinking on the surface; it allows high-quality foam sheets with a thickness as little as 0.2 mm to be manufactured.

The situation is the reverse in the case of chemical crosslinking by peroxides or with other agents and in the case of silane crosslinking, which processes are recommended for sheets having greater thicknesses, for example between 3 and 18 mm, since in these processes the crosslinking takes place throughout the thickness of the product in a homogeneous and uniform manner. On the other hand, these processes are much less suitable for very thin sheets since, on the microscopic scale, the dispersion of the crosslinking agents is less homogeneous than that which can be obtained by means of an electron beam.

Moreover, the expansion of crosslinked polyolefin foams occurs in three dimensions when no particular constraint is applied. It is important for the degree of crosslinking of the resin both at the start of the expansion and throughout its duration to be carefully controlled; the initial content of the compositions in terms of blowing agent and of crosslinking agent in the case of chemical crosslinking is, of course, tailored to this effect as well as to the durations and temperatures of the heat treatments.

Blowing agents fall within two main classes, namely volatile organic agents, such as chlorofluorocarbons (CFC), and chemical agents, such as azodicarbonamide. All blowing agents can be employed in accordance with the invention, according to all the well-known methods of implementation of the prior art comprising, depending on the case, extrusion operations and/or holding under pressure followed by expansion and/or heating, etc.

In the preparation of a crosslinked polyolefin foam, the start of the expansion usually takes place in an already partially crosslinked state of the resin. The purpose of this measure is to increase the viscosity of the resin, thus conditioning the regularity and fineness of the cellular structure finally obtained. In this case, the crosslinking continues during the expansion and, possibly, thereafter.

Nevertheless, the crosslinking may also be started during, or even after, the expansion (especially with the combination of a physical blowing agent, that is to say one that is active under the effect of expansion, such as isobutane, and of a silane crosslinking agent, mentioned above), without departing from the scope of the invention.

One of the drawbacks of crosslinked polyolefin foams known at the present time resides in their relative hardness. Their regular and fine cellular structure, having closed cells, gives them, however, good sealing properties, buoyancy, etc. However, in insulation applications especially for buildings, in forming seals, their mediocre compliance mentioned above constitutes a handicap, in particular in situations in which the foam product must conform to and/or plug up a complex relief having intricacies.

There is therefore a need to define suitable compliance characteristics, especially for the applications mentioned, and which nevertheless allow the cellular-structure and surface-appearance qualities of all crosslinked polyolefin foams to be maintained at a sufficient level.

This objective is achieved by the invention, the subject of which consists of a product made of crosslinked polyolefin foam, which has a compression of at most 7 N/cm$^2$, measured according to the ASTM D 1667 standard with a degree of compression of 30% and a rate of compression of 10 mm/minute, for a density of at least 100 kg/m$^3$, it being understood that this maximum compression may decrease for lower densities and increase for higher densities.

Preferably, the gel content of this product, defined as the percentage by weight of the insoluble fraction—in the form of dry extract—of a 50 mg specimen immersed for 24 hours at 120° C. in 25 ml of xylene dried over a molecular sieve, is between 30 and 70%, especially between 40 and 60% and, particularly preferably, between 45 and 55%.

For some crosslinked polyolefin foams having a density of 100 kg/m$^3$, compressions substantially less than 7 N/cm$^2$ are unavoidably associated with a coarse cellular structure and an unacceptable deterioration in the surface appearance. In this regard, the claimed maximum compression has a universal character under the defined conditions.

Many types of compositions are compatible with the invention; two advantageous types may be mentioned.

A first type of initial composition comprises at least 20% by weight of a polyethylene or of an essentially linear ethylene copolymer having a density between 0.80 and 0.96 g/cm$^3$.

Particularly preferably, the polyethylene or the ethylene copolymer used is obtained by metallocene catalysts and has a density of at most 0.92 g/cm$^3$. With regard to the composition of these preferred polymers and, in particular, their physical characteristics and the nature of the comonomers, Patent Application EP 0,702,032 A2, which also describes their treatment by crosslinking and expansion, is incorporated here by way of reference.

A second type of preferred initial composition comprises at least 10% by weight of at least one polyolefin elastomer chosen particularly preferably from an ethylene/vinyl acetate copolymer, an ethylene/propylene/diene monomer terpolymer and a butyl rubber.

According to a preferred embodiment with regard to the practical considerations associated with the manufacture, storage, commercialization and use of the product, the latter is advantageously essentially flat, having a thickness of between 2 and 100 mm and, preferably, between 8 and 30 mm. It can be prepared continuously using well-known processes, these being known as the Toray process with the use of a heated bath of KNO$_3$/NaNO$_2$, the Toray and Sekisui processes using a vertical oven and a countercurrent of hot air, the most advantageous processes within the context of the invention being the Hitachi and Furukawa processes using a horizontal oven and three zones of gradual heating.

The continuous web of foam product thus manufactured may be collected in the form of wound rolls or cut into sheets, depending on the envisaged use and the physical characteristics of the product.

According to one particularly advantageous embodiment, at least one of the two faces of the essentially flat product is adhesively bonded to a support. In general, the support has substantially the shape of a sheet. The adhesion results, for example, from a coextrusion operation or is obtained progressively as the foam is being formed, especially by creep of the resin, followed by physico-chemical transformation of the latter (the formation of intermolecular bonds, expansion) or even, possibly, by a chemical reaction between the resin and the support. In certain cases, this adhesion does not prevent removal of the support after the foam has formed.

Moreover, it should be pointed out that a product according to the invention having a support on each of its two faces cannot in general be wound, unless at least one of the two supports has particular mechanical properties (elasticity, compressibility etc.).

Furthermore the subject of the invention is also the application of the product described above as a seal, especially for buildings and for transport vehicles (motor-vehicle door seal, etc.).

Other features and advantages of the invention will appear from the following example.

EXAMPLE

Crosslinked polyolefin foams are prepared from blends having the following polymers:
→low density polyethylene sold by Polimeri Europa under the registered trademark RIBLENE:
  →grade FL 20;
    ◊ density d=0.921 g/cm$^3$,
    ◊ melt flow index (MFI)=2.2 g/10 min;
→ethylene copolymer elastomers obtained by metallocene catalysis and sold by Du Pont/Dow Elastomers under the registered trademark ENGAGE:
  →grade B400;
    ◊ d=0.870 g/cm$^3$,
    ◊ MFI=30 g/10 min;
  →grade B200;
    ◊ d=D.870 g/cm$^3$,
    ◊ MFI=5 g/10 min;
→ethylene/butene copolymer obtained by metallocene catalysis and sold by Exxon Chemical under the registered trademark EXACT:
  →grade .5008;
    ◊ d=0.865 g/cm$^3$,
    ◊ MFI=10 g/10 min;
→ethylene/vinyl acetate copolymer sold by Atochem under the registered trademark EVATANE:
  →grade 28–25;
    ◊ d=0.950 g/cm$^3$,
    ◊ MFI=22–29 g/10 min
(the weight content of vinyl acetate is between 27 and 29%);
→isobutylene/isoprene copolymer (butyl rubber) sold by Exxon Chemical under the name 268:
    ◊ d=0.920 g/cm$^3$,
    ◊ Mooney viscosity ML1+8 at 125° C.=51±5;
→isobutylene/isoprene copolymer sold by Exxon Chemical under the name 065:
    ◊ d=0.920 g/cm$^3$,
    ◊ Mooney viscosity ML1+8 at 100° C.=45±4.

The densities are determined according to the ASTM D 1505 standard, the MFI to the ASTM D 1238 standard and the Mooney viscosity to the ASTM D1646 standard.

A composition containing one or two of the aforementioned polymers is homogenized for 3 minutes. To this are added, over 40 seconds, a blowing agent in the usual proportion (approximately 30 g per 100 g of polymer). This blowing agent, sold by, Tramaco under the name TRACEL XL 9139, is an azodicarbonamide (blowing agent) mixed with an organic peroxide (crosslinking agent), both being dispersed in a polyolefin. Its decomposition temperature is approximately 145° C.

The compound is mixed for 10 minutes in a Brabender mixer at a temperature of 125° C. and a speed of rotation of 60 rpm.

The product is removed and placed between two sheets of glass fabric completely impregnated with poly (tetrafluoroethylene). A composite film 2 mm in thickness is thus produced by means of a hydraulic press heated to 110° C.

The expansion is carried out by heating at 210° C. for 4 minutes 30 seconds to 5 minutes. Finally, the sheets of glass fabric are removed from the foam obtained.

Various tests were carried out on this foam;
measurement of the density (in kg/m$^3$);
compression C (in N/cm$^2$) according to the ASTM D 1667 standard with a degree of compression of 30% and a rate of compression of 10 mm/minute;
deflection R (in N/cm$^2$) (the compression is held at 30% for 1 minute);
water absorption (in % by weight);
compression set (in %); this percentage expresses a thickness reduction, measured after a specimen is compressed to 25% of its thickness for 22 hours at room temperature followed by resting for 24 hours at the same temperature.

The results are given in Table I below:

TABLE I

| Composition | Density (kg/m$^3$) | C/R (N/cm$^2$) | Water absorption (%) | Compression set (%) |
|---|---|---|---|---|
| EN 8400/RIBLENE | | | | |
| 100/0 | 120 | 2.53/1.95 | 22.20 | 6.66 |
| 70/30 | 103 | 2.44/1.46 | 48.11 | 11.62 |
| 50/50 | 102 | 6.38/4.31 | 30.60 | 8.50 |
| EN 8200/RIBLENE | | | | |
| 100/0 | 126 | 4.25/3.33 | 19.50 | 7.66 |
| 70/30 | 104 | 5.36/3.86 | | 6.66 |
| EX 5008/RIBLENE | | | | |
| 100/0 | 130 | 1.92/1.52 | 35.60 | 6.70 |
| 70/30 | 120 | 6.35/3.70 | 11.80 | 7.60 |

With: EN = ENGAGE; EX = EXACT; C = Compression; R = Deflection

The crosslinked polyolefin foams obtained are noteworthy by their compliance, as indicated by the value of of between 1.92 and 6.38 N/cm$^2$ for densities ≥102 kg/m$^3$.

The foams have a fine structure and closed cells for the most part, as indicated by the relatively low amounts of absorbed water. Their gel content, as defined above, is between 40 and 60% in all cases.

They can be applied in various fields, including the most demanding fields like the sealing market.

The structure of the foams is good, including that of their skin: the surface is smooth and has a beautiful appearance free of irregularities.

A second series of tests was carried out by replacing the RIBLENE low-density polyethylene (LDPE) with elastomeric products having lower molecular weights, in this case the isobutylene/isoprene and ethylene/vinyl acetate copolymers mentioned above.

The results are given in Table II below.

TABLE II

| Composition | Density (kg/m$^3$) | C/R (N/cm$^2$) | Thickness (mm) |
|---|---|---|---|
| EN 8400/N27 | | | |
| 70/30 | 142 | 1.81/1.21 | 10.95 |
| 50/50 | 161 | 2.16/1.35 | 10.30 |
| EN 8400/065 | | | |
| 70/30 | 135 | 1.80/1.31 | 11.00 |
| EN 8400/EVA 2825 | | | |
| 70/30 | 137 | 2.70/2.15 | |

Although the expansion times were longer, between 5 minutes 30 seconds and 6 minutes, expansion took place to a lesser degree than with LDPE instead of an elastomer, as indicated by the relatively high densities ranging from 135 to 161 kg/m$^3$.

The foams obtained are remarkably compliant (low compressions).

The cellular structure of the foam produced from butyl 065 is less fine than the others.

Compared with the first series of tests (Table I), the foams of the second series (Table II) have a thinner skin which is more fragile and adheres more strongly to the support.

Thus, by virtue of the invention, a crosslinked polyolefin foam is available which combines a fine and uniform closed-cell cellular structure with excellent compliance. This foam is noteworthy in applications associated with sealing in buildings or transport vehicles.

What is claimed is:

1. A crosslinked polyolefin foam product, characterized by a compression of at most 7 N/cm$^2$, measured according to the ASTM D 1667 standard with a degree of compression of 30% and a rate of compression of 10 mm/minute, for a density of at least 100 kg/m$^3$, it being understood that this maximum compression may decrease for lower densities and increase for higher densities and a gel content of at most 60%.

2. Product according to claim 1, characterized in that the foam is obtained from a composition comprising at least 20% by weight of a polyethylene or of an essentially linear ethylene copolymer having a density between 0.80 and 0.96 g/cm$^3$.

3. Product according to claim 2, characterized in that the polyethylene or the ethylene copolymer is obtained by metallocene catalysis and has a density of at most 0.92 g/cm$^3$.

4. Product according to claim 1, characterized in that the foam is obtained from a composition comprising at least 10% by weight of at least one polyolefin elastomer.

5. Product according to claim 4, characterized in that the polyolefin elastomer is chosen from the group comprising an ethylene/vinyl acetate copolymer, an ethylene/propylene/diene monomer terpolymer and a butyl rubber.

6. Product according to claim 1, characterized in that it is essentially flat having a thickness of between 2 and 100 mm.

7. Product according to claim 6, characterized in that its thickness is between 8 and 30 mm.

8. Product according to claim 6, characterized in that at least one of its two faces is adhesively bonded to a support.

9. Product according to claim 8, characterized in that the support is a glass fabric completely impregnated with poly(tetrafluoroethylene).

10. A seal, comprising the product according to claim 1.

11. Product according to claim 1, characterized by a gel content of 40 to 60%.

12. Product according to claim 1, characterized by a gel content of 45 to 55%.

* * * * *